United States Patent [19]

Clapper et al.

[11] Patent Number: 4,522,230

[45] Date of Patent: Jun. 11, 1985

[54] ORIFICE PLATE SEAL RING FOR CONTROLLED CLOSURE CHECK VALVE

[75] Inventors: Robert L. Clapper, Cary, N.C.; Richard J. Gradle; Earl A. Bake, both of Pittsburgh, Pa.

[73] Assignee: Rockwell International Corporation, Pittsburgh, Pa.

[21] Appl. No.: 468,832

[22] Filed: Feb. 23, 1983

[51] Int. Cl.³ .............................................. F16K 31/38
[52] U.S. Cl. .................. 137/496; 137/514.7; 251/51; 251/64; 92/168; 188/271; 188/322.17; 277/3; 277/27; 277/71; 277/79
[58] Field of Search ............... 137/496, 514.7; 251/50, 251/51, 64, 172, 175; 92/168; 188/271, 322.17; 277/3, 27, 71, 79

[56] References Cited

U.S. PATENT DOCUMENTS

| | | |
|---|---|---|
| 1,961,469 | 6/1934 | West et al. .................. 251/51 |
| 2,506,162 | 5/1950 | Metzgar .................. 137/514.7 |
| 2,574,314 | 11/1951 | Arden .................. 251/51 |
| 2,665,877 | 1/1954 | MacGregor .................. 137/514.7 |
| 2,710,736 | 6/1955 | Miller .................. 251/51 |
| 3,837,445 | 9/1974 | Pierle .................. 188/322.17 |
| 3,920,216 | 11/1975 | Barnum et al. .................. 251/51 |
| 4,046,164 | 9/1977 | Pool .................. 137/514.7 |
| 4,071,057 | 1/1978 | Nagase .................. 188/322.17 |
| 4,342,447 | 8/1982 | Marx .................. 188/322.17 |
| 4,391,184 | 7/1953 | Yamane et al. .................. 277/3 |

Primary Examiner—Alan Cohan
Assistant Examiner—John A. Rivell

[57] ABSTRACT

A check valve is comprised of a body having inlet and outlet passages and a cylindrical chamber within the body, the axis of which forms an angle with the axis of the inlet and outlet passages. An orifice plate in the cylindrical chamber divides the chamber into a dashpot chamber and a valve chamber which is in communication with the inlet and outlet passages. A valve seat in the valve chamber separates the inlet and outlet passages. A valve closure element is mounted for reciprocation in the valve chamber between a valve open position and a valve closed position where an element is seated upon the seat. A piston is mounted for reciprocation in the dashpot chamber. A piston rod extends through an opening in the orifice plate and connects the closure element and the piston. Means are provided to apply the pressure in the outlet passage to the piston to urge the piston and closure element toward valve closed position. At least two parallel bleed passages are provided through the orifice plate to allow the flow of fluid between the dashpot chamber and the valve chamber. A pressure energized sealing member is responsive to the pressure differential between the dashpot chamber and the valve chamber to close one of the bleed passages when the differential exceeds a predetermined amount.

9 Claims, 8 Drawing Figures

ORIFICE PLATE SEAL RING FOR CONTROLLED CLOSURE CHECK VALVE

BACKGROUND OF THE INVENTION

1. Field of the Invention

This invention relates to check valves which may be used in fluid lines, for example feedwater supply lines for steam generators, to prevent significant reverse flow of feedwater from the steam generator in the event of abnormal reduction of pressure in the feedwater line.

2. Description of the Prior Art

In many industrial processes it is important that reverse flow in the fluid lines be prevented in the event of loss or reduction of pressure. One such application is in the feedwater lines in steam generating systems. In order to prevent damage to the steam generator and to the pumps which supply the feedwater to the steam generator, it is important that any reverse flow from the steam generator back towards the pump be prevented in the event there is a drop in pressure in the feedwater line which might be caused, for example, by a failure of one or more of the supply pumps or by a rupture in the feedwater supply line. Unless means are provided to quickly respond to any tendency for reverse flow, serious damage can be caused to either the steam generator or the feedwater pumps. Check valves such as that disclosed in U.S. Pat. No. 4,046,164 are conventionally used to provide this protection. As described in that patent, such valves are comprised of a dashpot controlled valve element which is held open by the fluid pressure when the flow is in the normal direction and at normal pressure. However, any significant drop in pressure in the inlet to the valve will be sensed by the valve and will cause it to automatically close to prevent any reverse flow. While it is desirable that such valves should respond quickly to any such drop in pressure, it is also important that the rate of closure be controlled to prevent the valve from impacting too heavily on the valve seat thereby damaging either the valve or the seat or both after one or more closure operations. Also, uncontrolled closure of the valve at too high a speed may also cause damaging pressure surges due to "water hammer". A closure time in the order of one second will provide this requisite protection against reverse flow which will prevent excessively large impacts on the valve seat and pressure surges. The dashpot is provided to control the rate of closure to prevent such impacting, all as described in U.S. Pat. No. 4,046,164.

In the valve therein described, the escape of fluid from the dashpot chamber is primarily through an annular space between the orifice plate and the piston rod of the dashpot or through special passages through the orifice plate. In either case, the fluid bleed passage is fixed in area and is sized to provide the requisite closure time, i.e., in the order of one second, under the most extreme conditions, namely, a line rupture which could cause a complete loss of pressure in the feedwater line upstream of the valve. It will be appreciated that under these conditions the pressure differential applied to the orifice plate of the dashpot is greatest.

One of the problems encountered in such a valve with a fixed orifice area is that when less extreme conditions are encountered, i.e., when there is a less drastic drop in the pressure in the feedwater line, such a valve may take an excessively long time to close. Another problem encountered with such valves, particularly those valves which utilize a controlled clearance between the piston rod and the orifice plate, is that such clearance may be adequately controlled in the larger sizes of valves, such as those from 12 inches or above but in the smaller sizes below that range such a clearance is difficult to control with any degree of precision in order to provide the requisite degree of uniformity of performance from valve to valve.

SUMMARY OF THE INVENTION

Accordingly, in order to overcome the problems with the prior art valves as described above, applicants have developed a valve which will respond to varying conditions of pressure loss to provide adequate closure times for all different degrees of pressure reduction upstream of the valve and will eliminate the dimensional/area control problems of prior art valves in the smaller sizes of valves. To accomplish these results, applicants have provided a pressure sensitive seal in the orifice plate between the orifice plate and the piston rod. As in conventional valves, a clearance space is provided between the piston rod and the orifice plate and, in addition, a suitably sized second passage is provided in the orifice plate to provide an additional flow passage for the fluid to flow out of the dashpot during the closure cycle. As will be described hereinafter, the seal is pressure sensitive and under extreme conditions of pressure differential across the valve, such as would be experienced with a complete line break upstream of the valve, the seal will be pressure energized to substantially close off the clearance space between the piston rod and the orifice plate so that under such conditions the fluid can flow out of the dashpot only through the additional passage in the orifice plate which is sized to give adequate closure time under such extreme conditions. If, on the other hand, a less drastic drop in pressure is experienced upstream of the valve, such as might be experienced in the event of failure of one of a battery of several feedwater pumps, the pressure drop across the orifice plate will be lower and insufficient to actuate the seal between the piston rod and the orifice plate, thereby providing an additional passage for the flow of fluid out of the dashpot. Consequently, under such less drastic conditions of pressure drop, the additional flow passage allows the valve to close in the requisite time.

DESCRIPTION OF THE PREFERRED EMBODIMENTS

Figure 1:
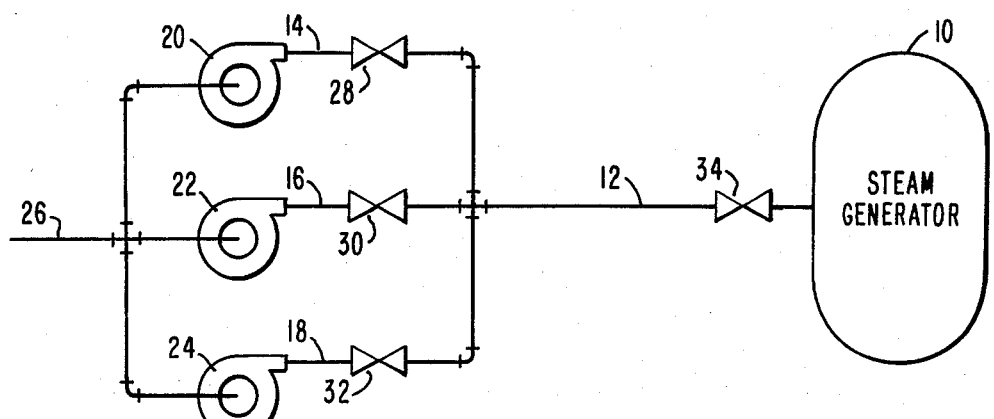
FIG. 1 is a schematic drawing of a feedwater system for a steam generator in which valves employing the instant invention may be used.

In FIG. 1, a steam generator 10 is supplied with feedwater from line 12 in which is located closely adjacent the generator a check valve 34 of the type herein described. Line 12 is supplied from the output lines 14, 16 and 18 of a battery of pumps 20, 22 and 24 which take their suction from line 26 leading from a source of feedwater. Check valves 28, 30 and 32 also of the type herein described may be located respectively in lines 14, 16 and 18. It is essential that the valves 34, 28, 30 and 32 close rather quickly within the requisite time of in the order of one second. In the event of a line break upstream of the valves, excessive reverse flow in the line 12 or in lines 14, 16 and 18 would not only accelerate the loss of output steam pressure from the steam generator but could damage the steam generator. Similarly, excessive reverse flow in any of the lines 14, 16 and 18 could cause severe damage to the pumps supplying the lines. However, the feedwater system shown can experience a drop in pressure which is less severe than that which would be caused by a complete line break, such as might be caused, for example, if one of the pumps 20, 22 and 24 should fail which would cause a drop but not a complete loss in pressure in line 12. With a passage through the orifice plate of a fixed area, the valve 28, 30, 32 and 34 under such conditions might not respond quickly enough to prevent a substantial reverse flow in line 12 and any one of the lines 14, 16 and 18 leading from the failed pump. If, for example, pump 20 should fail, due to the inertia of its moving parts, the pump will not stop operating abruptly but will continue to produce a declining output pressure for some time after failure. Thus, the pressure in lines 12 and 14 will drop gradually and, similarly, if valve 28 has a bleed passage through the orifice plate of fixed size designed to accommodate an abrupt and severe loss of pressure, it will not respond quickly enough to prevent significant backflow through the pump 20 from line 12 and the output lines 16 and 18 of pumps 20, 22 and 24.

Figure 2:
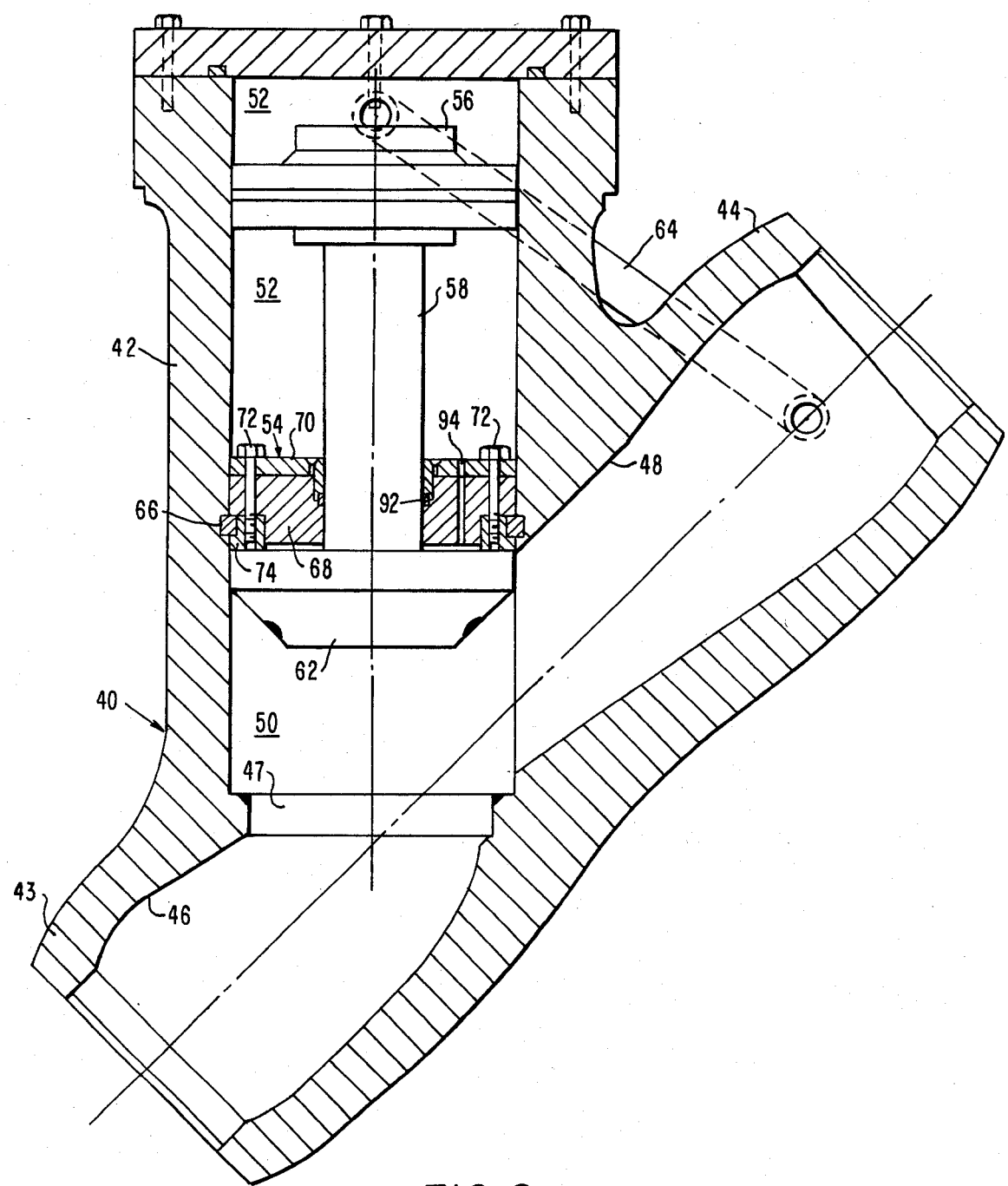
FIG. 2 is a elevational view in cross section of a valve employing the instant invention.

FIG. 2 shows a valve embodying the instant invention and is comprised of a body 40 having inlet and outlet portions 43 and 44 and a bonnet portion 42 which extends from the inlet and outlet portions at an angle of approximately 45 degrees with the axis of inlet passage 46 and outlet passage 48 formed respectively in inlet and outlet portions 43 and 44. The inlet and outlet passages 46 and 48, respectively, are separated by a valve seat 47.

A control chamber is formed within the bonnet portion 42, the axis of which is at an angle of approximately 45 degrees with the axes of the inlet and outlet passages 46 and 48. The control chamber within bonnet portion 42 is divided into a lower valve chamber 50 and a dashpot chamber 52 by an orifice plate assembly 54. A piston 56 is reciprocably received within the dashpot chamber 52 and has a piston rod 58 extending from its lower side and through an opening in orifice plate 54. The lower end of the piston rod extends into chamber 50 and has a valve closure element 62 mounted on it within the chamber 50. An equalizing line 64 extends from the dashpot chamber 52 above the piston 56 to the outlet passage 48 to insure that the pressure within the passage 48 will be applied to the upper surface of the piston 56 at all times.

A retainer ring 66 is received within an annular groove formed in the cylindrical wall within the lower end of the bonnet portion 42. The orifice plate 54 is comprised of a lower plate 68 and an upper plate 70 which are secured together by a number of circumferentially spaced bolts, two of which are shown at 72. The threaded ends of bolts 72 project through the lower orifice plate 68 into a circumferential relief formed therein and are threaded into a locking ring 74 to thereby clamp the retainer ring 66 between the lower plate 68 and the retainer ring 74.

Figure 3A:
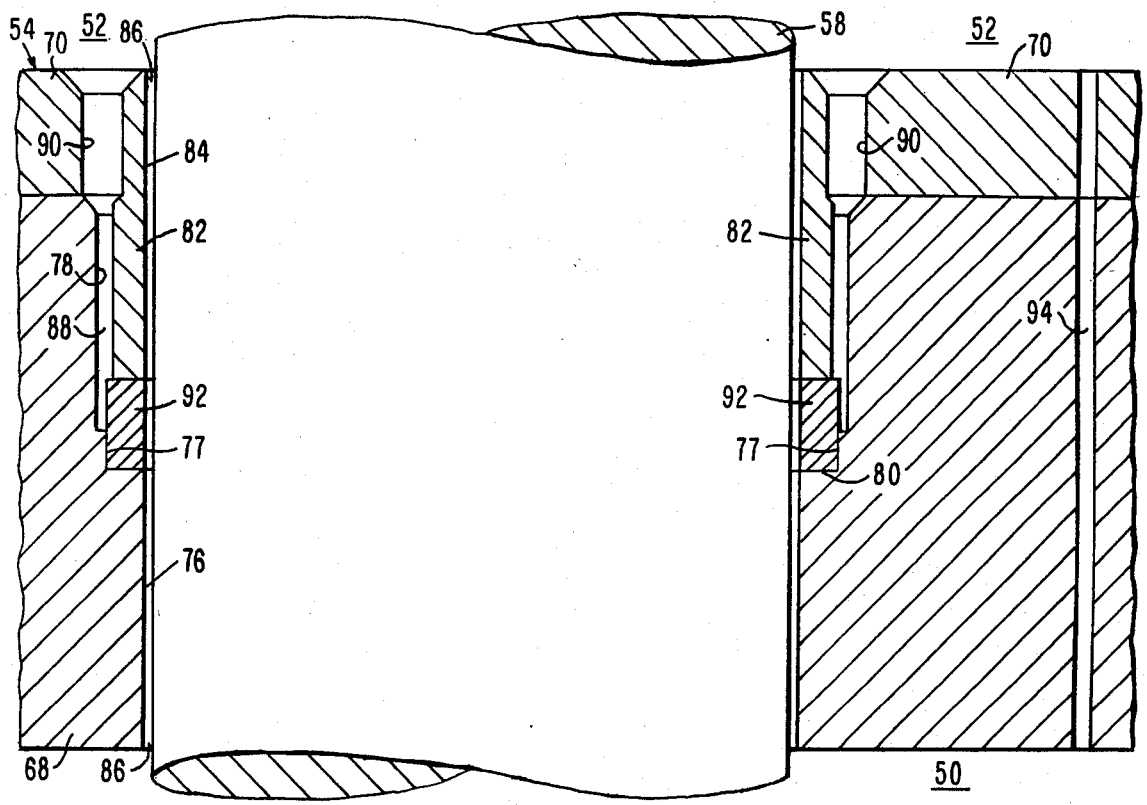
FIG. 3A is an enlarged view of the piston rod and orifice plate showing the details of the seal arrangement when the seal is in its normal or non-energized condition.
Figure 3B:
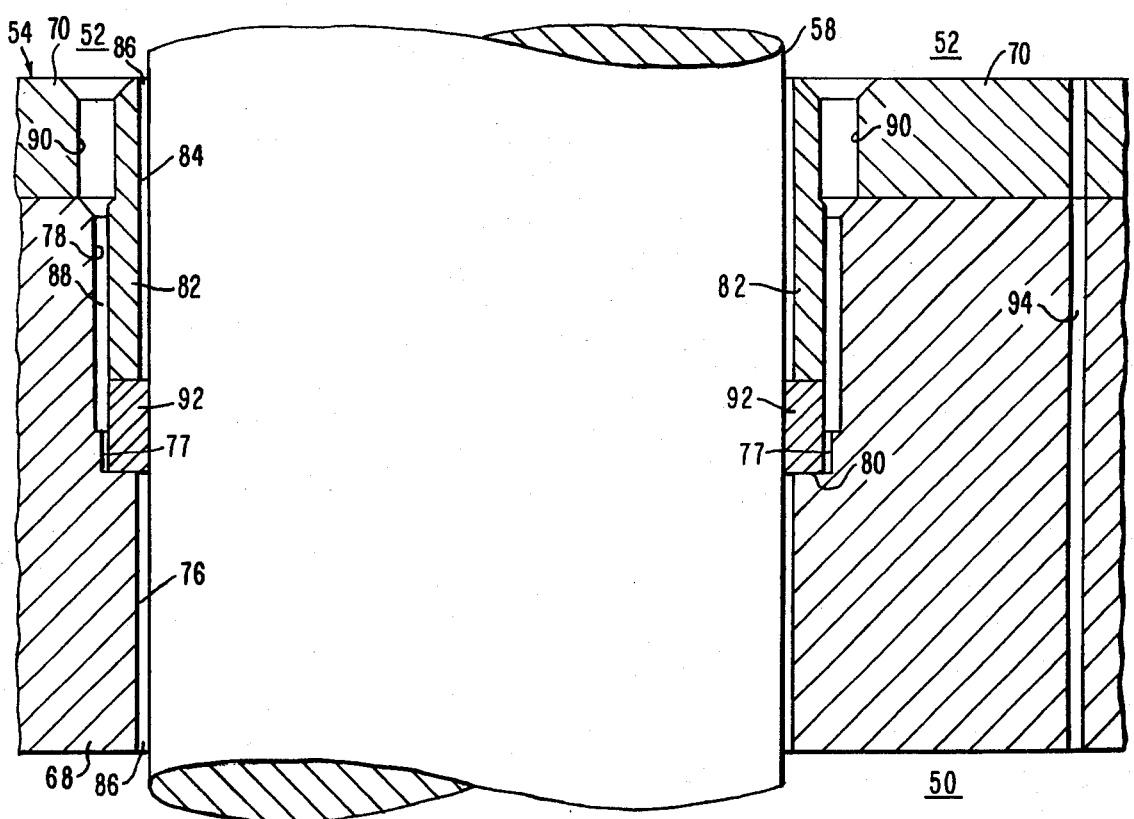
FIG. 3B is an enlarged schematic diagram of the piston rod and orifice plate showing the details of the seal arrangement when the seal is in its energized condition.

Referring to FIGS. 3A and 3B showing the details of the fit and sealing arrangement between the orifice plate 54 and piston rod 58, the lower plate 68 has a primary bore 76 and a counterbore 78 each of which extends almost half the distance of the thickness of the lower plate 68. An annular shoulder 77 is formed between the top of bore 76 and the bottom of counterbore 78 and itself is formed on a bore the diameter of which is greater than that of bore 76 but smaller than that of counterbore 78. An annular radially extending seal seating surface 80 is formed between primary bore 76 and shoulder 77. The upper plate 70 has an annular projecting neck portion 82 which, when the plate 70 is secured to the plate 68, projects into the annular space between the counterbore 78 and the piston rod 58. The radius of primary bore 76 is of such a dimension to provide a clearance between the bore and the rod 58 thereby providing the lower portion of annular passage 86 for the flow of fluid between the walls of the bore 76 and the rod 58. The projecting neck portion 82 has an inner bore 84 of approximately the same radius as the bore 76 to form with shaft 58 the upper portion of annular passage 86 so that a composite annular passage 86 is formed between the bores 76 and 84, on one hand, and the shaft 58, on the other hand, for the passage of fluid between the dashpot chamber 52 and the valve chamber 50. The outer radius of the neck portion 82 is of such a dimension to form an annular passage 88 between counterbore 78 and the outer surface of neck portion 82. A series of circumferentially spaced openings 90 through the upper orifice plate 70 communicate with the annular space 88 to place the lower portion of dashpot chamber 52 into communication with annular passage 88. The axial dimension of neck portion 82 is such as to form with the lower end surface of the neck portion 82, the seating surface 80, shoulder 77 and counterbore 78 an annular space for receiving seal ring 92 and which opens to annular passage 86. Passage 94 extends through upper plate 70 and lower plate 68 to provide an additional passage for the flow of fluid between the chambers 50 and 52.

Referring to FIG. 2, in operation when the flow into the inlet of the valve is normal and the upstream pressure is normal, the pressure acting against the valve element 62 will cause it to be raised to the position shown. Since chamber 52 and chamber 50 are in communication with each other through passages 86 and 94, pressure within each chamber is equal and thus the only force resisting the opening of the valve (in addition to gravity) is the pressure in the chamber 52 above the piston 56. Since the chamber above the piston is connected to the outlet at a point downstream of the valve 62, the pressure applied to the upper surface of the piston 56 will be less than the pressure applied to the bottom of the valve 62 and the valve will, therefore be held in full open position under normal conditions of flow and pressure. In the event of a drop in pressure in the feedwater line upstream of the valve caused by a line rupture or the failure of one or more pumps, the pressure on the outlet side of the valve may be greater than the pressure on the upstream side of the valve, resulting in a tendency for reverse flow through the valve. However, in such a case, since the pressure from the outlet of the valve is applied to the top of piston 56 and the pressure in the inlet of the valve below the valve 62 is less than the outlet pressure, the valve will be closed under the influence of the pressure in chamber 52 above the piston 56 and the weight of the elements. As the piston 56 and the valve 62 are forced downwardly, flow will be forced out of dashpot chamber 52 beneath the piston into chamber 50 solely through passage 94 in the orifice plate or, alternatively, depending on pressure conditions, through both passage 94 and annular passage 86.

Figure 4:
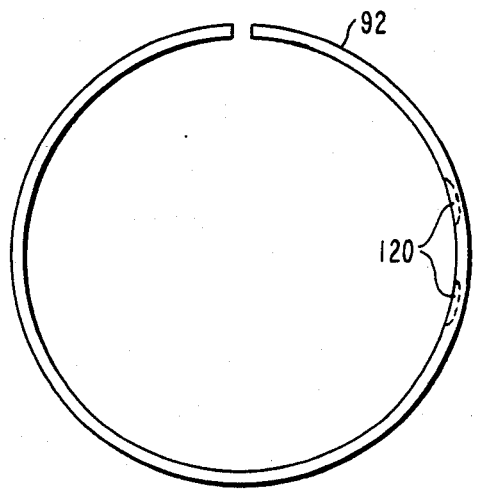
FIG. 4 is a top plan view of the seal ring employed in the instant invention.

As shown in FIG. 4, the seal ring 92 may be a conventional butt-cut rectangular cross section piston ring having the free ends separated a sufficient amount to allow the ring to flex under the influence of pressures to which it is subjected. The ring may be made from stainless steel to minimize corrosion and the seal ring seat 80 may be coated or inlaid with a low friction material such as Stellite 21 to minimize friction between the ring and its seat. The diameter of ring 92 in its free condition, as shown in FIG. 4, is such that under normal line flow conditions, as shown in FIG. 3A, the ring will be under a slight tension so that it abuts firmly against shoulder 77 to maintain the ring centered with respect to rod 58 to thereby maintain a uniform clearance between the ring and rod in this condition.

When there is a severe loss of upstream pressure casued, for example, by a line break, the pressure differential between the top of the piston and the bottom of the valve 62 and between chamber 52 beneath the piston 56 and chamber 50 will be greatest. The relatively high pressure in chamber 52 beneath the piston will immediately be communicated to the annular chamber 88 and applied to the outside peripheral surface of seal ring 92. Since the annular passage 86 and the passage 94 are somewhat restricted, compared to the radial area of passage 88, the pressure on the interior surface of the ring will be substantially that within the chamber 50, so that under such conditions the ring will be forced to close or contract to the point where it sealingly engages the outer surface of the piston rod 58 as shown in FIG. 3B to close off annular passage 86. Thus, all of the fluid in chamber 52 beneath the piston must be exhausted through only the passage 94. As explained above, this passage has been sized to provide a closing time in the order of one second under high pressure differential conditions.

If, on the other hand, the loss in pressure upstream of the valve is less severe or more slowly developing caused, for example, by the failure of one of the pumps, the differential pressure across the piston-valve assembly will be of less magnitude and the pressure in the chamber 52 beneath the piston will be insufficient to cause the ring 92 to contract from the condition shown in FIG. 3A. Under these conditions, fluid will flow from lower chamber 52 to chamber 50 through both passage 94 and annular passage 86 allowing the valve to close much more quickly than it would if only one passage were provided through the orifice plate, the size of which is designed to allow a second closing time under the more severe line break conditions.

Figure 5:
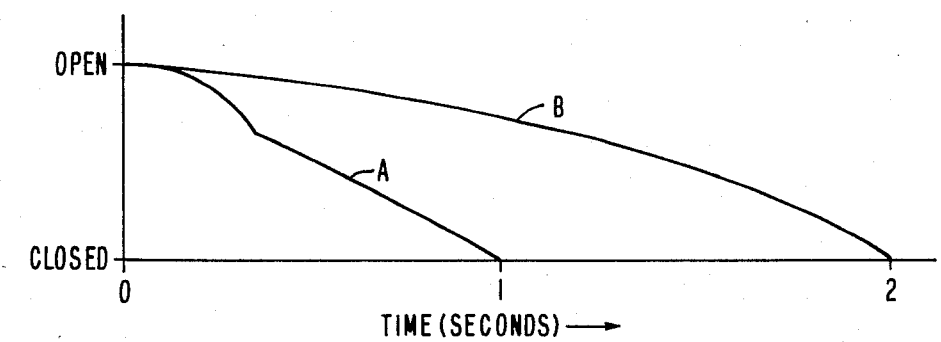
FIG. 5 is a chart showing the closure time of a valve employing the instant invention under both extreme conditions of pressure drop and less drastic conditions of pressure drop in the fluid line upstream of the valve.

FIG. 5 is a chart of the closing performance of a valve embodying the instant invention under both severe back pressure differential conditions and the more moderate conditions. Curve A shows the closing performance under the more severe back pressure conditions caused by the upstream line break when the high back pressure differential causes the seal ring 92 to seal off annular passage 86. Under such conditions the valve would reach a closed condition in approximately one second as shown. Curve B, on the other hand, shows the closing performance of the valve when the differential conditions are more moderate and the pressure differential was, therefore, of not great enough magnitude to cause the seal ring 92 to close off passage 86 so that the fluid from the lower part of chamber 52 would flow through both passage 86 and 94. Under these conditions as shown, the valve would close in approximately two seconds, an acceptable closure time.

In a system such as that shown in FIG. 1 where valve 34 is located close to the stream generator and the valves 28, 30 and 32 are located close to the outlet of the pumps, it will be appreciated that valve 34 is most likely to be exposed to the severe back pressure differential condition caused by a line break. On the other hand, valves 28, 30 and 32 are more likely to be exposed to the more moderate back pressure conditions. However, since the valve of the instant invention will provide suitable closing times under both conditions, such a valve may be used in both applications.

As previously mentioned, in smaller sizes of valves, the size of the annular clearance between the piston rod and the orifice plate become so small that its size could not be controlled with sufficient precision to produce uniform size passages from valve to valve. Of course, smaller size valves could be made in accordance with FIG. 2 of U.S. Pat. No. 4,046,164 in which the piston rod is always sealed by seal rings with respect to the baffle or orifice plate and the fluid being caused to flow from the dashpot into the lower chamber solely through passages drilled through the orifice plate, the size of which can be controlled. However, the use of such rings which are constantly in sealing contact with the piston rod introduces complications in the performance of the valve particularly when foreign matter is encountered which tends to lodge between the piston rod and the orifice plate. In a valve employing the instant invention, the annular passage or gap 86 between the piston rod and the orifice plate can be of sufficient size to eliminate this problem since this passage will be closed by the seal ring 92 under the extreme pressure loss conditions. Under the more moderate pressure loss conditions, the passage 86 will be open and of such a size so that together with passage 94 a reasonable closing time will be obtained.

Figure 6A:
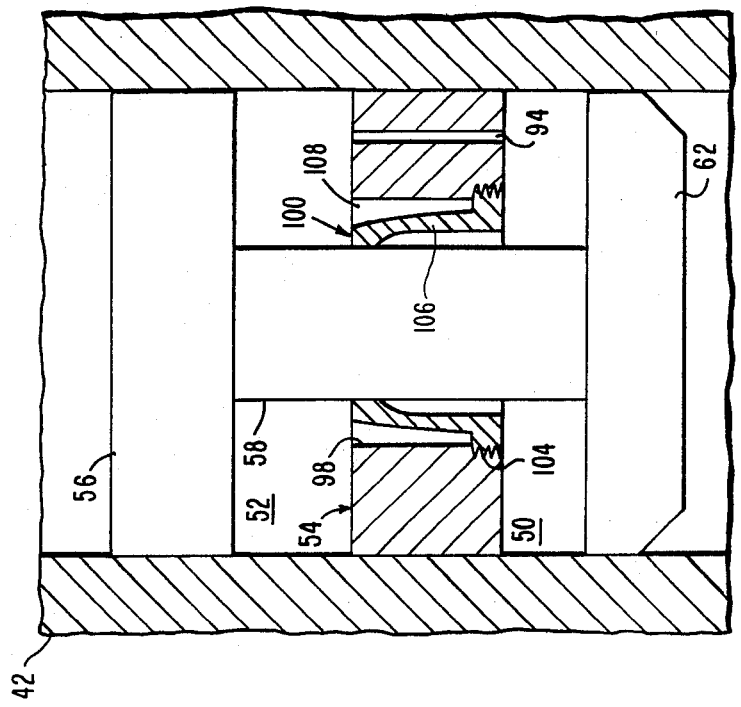
FIGS. 6A and 6B are enlarged schematic diagrams showing the details of an alternative seal arrangement respectively in its non-energized condition and in its energized condition.
Figure 6B:
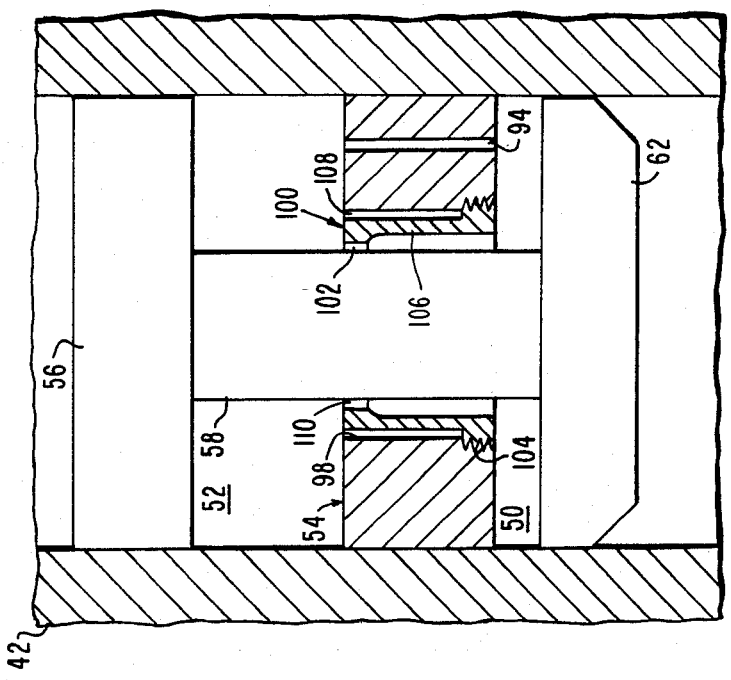

FIGS. 6A and 6B are illustrations of an alternative embodiment of the instant invention in which like parts are numbered the same as their counterparts in the embodiment of FIGS. 2, 3A and 3B. In the alternative form, a somewhat enlarged opening 98 is formed in the orifice plate 54 through which the piston rod loosely extends between chamber 52 and chamber 50. A relatively thin flexible bootlike seal element 100 having an opening 102 is located in the opening 98. The sealing element is a tubular extension 106, the outside diameter of which is sized to produce an annular axially extending space 108 between the element 100 and the opening 98 through the orifice plate. The lower portion of the sealing element 100 is secured to the orifice plate 104 to prevent the flow of fluid between chambers 50 and 52 through passage 108. The opening is sized to produce a reduced annular passage 110 between the interior of the element and the rod 58 when the element is in its untensioned condition. As in the case of the embodiment shown in FIGS. 2, 3A and 3B, a parallel passage through the orifice plate is provided as shown at passage 94.

In the condition shown in FIG. 6A, the sealing element 100 is shown in its untensioned condition it would assume under conditions of moderate pressure differential across the orifice plate 54. Under these conditions, the annular passage 110 would be opened and fluid would flow through the passage 110 as well as the passage 94 thus providing an appropriate closing time under such moderate pressure differential conditions. If, however, the pressure differential across the orifice plate were more severe, the pressure in chamber 52 would be communicated to the annular passsage 108 surrounding the tubular extension 106. This elevated pressure differential would cause the tubular extension 106 to collapse around the piston rod 58 and close off annular passage 110 as shown in FIG. 6B. Thus, under these conditions, the only passage available for the fluid leaving chamber 52 would be through passage 94 which is sized to produce the appropriate closure time for such severe conditions.

If desired, axially extending slits could be formed in the tubular extension 106 which would extend axially from a point near the bottom enlarged portion of the sealing element to its upper extremity. Such slits would provide greater flexibility in the sealing element which would allow for greater flexibility in design for various pressure differentials. However, with or without the slits, the sealing element would be adapted to collapse about the rod 58 under a predetermined pressure differential while remaining in its untensioned condition as shown in FIG. 6A in pressure differentials beneath the said predetermined pressure differential.

It should be noted that while the passage 94 of FIGS. 3A, 3B, 6A and 6B represents a convenient and preferred means of controlling valve closure speed when the pressure energized seal between the orifice plate and piston rod has closed, an alternative arrangement could be utilized whereby the passage 94 could be eliminated. Such an alternative arrangement would provide an annular passage between the piston rod and the orifice plate of sufficient area to permit an appropriate closure speed under the moderate pressure differential conditions described above. The ring 92 could have a number of spaced recesses, two of which are shown in dotted lines at 120 in FIG. 4, or other passages formed through the axial thickness of the ring. Thus, under moderate pressure differentials with the ring in the condition shown in FIG. 3A, the unrestricted passage 86 would allow sufficient flow to provide an appropriate closure time. Under the more severe conditions described above, the ring would be contracted into contact with the piston rod and the flow through passage 86 would be restricted to that which could pass through the recesses 120 or other passages through the ring. It will be appreciated that a similar arrangement could be provided in connection with the sealing element 100 of FIGS. 6A and 6B.

We claim:

1. A check valve comprised of a body having inlet and outlet passages and a control chamber within said body, an orifice plate dividing said chamber into dashpot chamber and a valve chamber which is in communication with said inlet and outlet passages, a valve seat in said valve chamber separating said inlet and said outlet passages, a valve closure element mounted for reciprocation in said valve chamber between a valve open position an a valve closed position where said element is seated upon said seat, a piston mounted for reciprocation in said dashpot chamber, a piston rod extending through an opening in said orifice plate connecting said closure element and said piston, means to apply the pressure in said outlet passage to the piston to urge the piston and closure element toward valve closed position when the pressure in said outlet passage exceeds the pressure in said inlet passage, passage means through said orifice plate to allow the flow of fluid from said dashpot chamber to said valve chamber at a first rate of flow, sealing means responsive to the pressure differential between said dashpot chamber and said valve chamber to close a portion of said passage means and reduce the rate of flow from said dashpot chamber to a second rate of flow when said pressure in said dashpot chamber exceeds the pressure in said valve chamber by a predetermined amount.

2. The check valve defined in claim 1, in which said passage means is comprised of at least two parallel bleed passages, one of which is closed by said pressure energized sealing means when said pressure differential exceeds a predetermined amount.

3. The check valve defined in claim 2, in which one of said bleed passages is comprised of an annular clearance between said piston rod and the wall of said opening in said orifice plate and said sealing means is a sealing member carried by said orifice plate and adapted to close said one of said bleed passaged in response to a pressure differential of said predetermined amount.

4. The check valve defined in claim 3, in which said sealing member is a contractable annular member embracing said piston rod which under moderate pressure differentials across said orifice plate provides an annular passage between said annular member and said rod, together with means to apply the pressure in said dashpot to the exterior of said annular member, said annular member being adapted to close said annular passage when said pressure in said dashpot exceeds a predetermined magnitude.

5. The check valve defined in claim 4, in which said annular member is a ring mounted in a groove formed in the wall of said opening through said orifice plate.

6. The check valve defined in claim 4, in which said sealing member is a collapsible sleeve mounted in the opening in said orifice plate.

7. The valve defined in claim 1, in which said passage means is comprised of an annular clearance between said piston rod and the wall of said opening in said orifice plate and said sealing means is an annular member carried by said orifice plate and adapted to provide a restriction in said clearance in response to a pressure differential of said predetermined amount.

8. The valve defined in claim 7, in which said annular member is a ring mounted in groove formed in the wall of said opening through said orifice plate, said ring having axially extending passages therethrough.

9. The valve defined in claim 7, in which said sealing member is a collapsible sleeve mounted in the opening in said orifice plate, said sleeve having axially extending passages therethrough.

* * * * *